United States Patent
Sakabe et al.

(10) Patent No.: US 10,409,415 B2
(45) Date of Patent: Sep. 10, 2019

(54) INFORMATION INPUT DEVICE

(71) Applicant: Brother Kogyo Kabushiki Kaisha, Nagoya-shi, Aichi-ken (JP)

(72) Inventors: Takuji Sakabe, Chita-gun (JP); Tetsuya Ishiyama, Chita (JP); Yusuke Imamura, Nagoya (JP); Yuichiro Suzuki, Komaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 84 days.

(21) Appl. No.: 15/643,780

(22) Filed: Jul. 7, 2017

(65) Prior Publication Data
US 2017/0308230 A1    Oct. 26, 2017

Related U.S. Application Data

(63) Continuation-in-part of application No. PCT/JP2016/050306, filed on Jan. 7, 2016.

(30) Foreign Application Priority Data

Jan. 9, 2015 (JP) ................................ 2015-002948

(51) Int. Cl.
*G06F 3/041* (2006.01)
*G06F 3/046* (2006.01)
(Continued)

(52) U.S. Cl.
CPC ............ *G06F 3/0416* (2013.01); *B43K 29/08* (2013.01); *G06F 1/1616* (2013.01);
(Continued)

(58) Field of Classification Search
CPC .......... G06F 1/16; G06F 1/1615; G06F 3/041; G06F 1/3206
See application file for complete search history.

(56) References Cited

U.S. PATENT DOCUMENTS 6,888,538 B2 * 5/2005 Ely ...................... G01D 5/2073
178/18.07
9,948,143 B2 * 4/2018 Abe ...................... H02J 7/0042
(Continued)

FOREIGN PATENT DOCUMENTS

JP    2008-026217 A    2/2008
JP    2012-014461 A    1/2012
(Continued)

OTHER PUBLICATIONS

Mar. 1, 2016—International Search Report—Intl App PCT/JP2016/050306.

(Continued)

Primary Examiner — William Lu
(74) Attorney, Agent, or Firm — Banner & Witcoff, Ltd.

(57) ABSTRACT

An information input device has a determination portion, a detection portion, and a switching portion. The detection portion includes two areas that plural coils are arranged along a plane. The two areas switch between a folded state facing the areas each other and a two-page spread state not facing the areas each other. When an induced current is not detected in the coils of the two areas in the continuous reception state in which the induced current of the coils can be detected, the determination portion determines that the detection portion is in the two-page spread state. When the induced current is detected in the coils of the two areas in the continuous reception state, the determination portion determines that the detection portion is in the folded state, and the switching portion switches the state of the detection portion from a normal state to a power saving state.

7 Claims, 7 Drawing Sheets

(51) Int. Cl.
*G06F 1/3206* (2019.01)
*B43K 29/08* (2006.01)
*G06F 1/3296* (2019.01)
*G06F 3/0354* (2013.01)
*G06F 1/16* (2006.01)
*G06F 3/038* (2013.01)

(52) U.S. Cl.
CPC .......... *G06F 1/1643* (2013.01); *G06F 1/1647* (2013.01); *G06F 1/1677* (2013.01); *G06F 1/3206* (2013.01); *G06F 1/3296* (2013.01); *G06F 3/0383* (2013.01); *G06F 3/03545* (2013.01); *G06F 3/041* (2013.01); *G06F 3/046* (2013.01)

(56) References Cited

U.S. PATENT DOCUMENTS

| | | | | |
|---|---|---|---|---|
| 2012/0274588 | A1* | 11/2012 | Bamba | G06F 1/3218 345/173 |
| 2014/0132533 | A1* | 5/2014 | Inaba | G06F 3/03545 345/173 |
| 2014/0132554 | A1* | 5/2014 | Sakabe | G06F 3/046 345/174 |
| 2014/0313432 | A1* | 10/2014 | Kasugai | G06F 1/1643 349/12 |
| 2014/0313654 | A1* | 10/2014 | Kasugai | G06F 3/0488 361/679.4 |
| 2015/0048349 | A1* | 2/2015 | Kawata | H01L 51/0097 257/40 |
| 2015/0054797 | A1* | 2/2015 | Takahashi | G06F 3/03545 345/179 |
| 2015/0212647 | A1* | 7/2015 | Kim | G02B 27/017 345/173 |
| 2015/0378557 | A1* | 12/2015 | Jeong | G06F 3/0488 715/835 |
| 2016/0147292 | A1* | 5/2016 | Sunwoo | G06F 1/1647 713/323 |

FOREIGN PATENT DOCUMENTS

| | | |
|---|---|---|
| JP | 2012-231325 A | 11/2012 |
| JP | 2013-246661 A | 12/2013 |
| JP | 2014-096071 A | 5/2014 |

OTHER PUBLICATIONS

Jul. 11, 2017—(WO) IPRP with Written Opinion—App PCT/JP2016/050306.

* cited by examiner

INFORMATION INPUT DEVICE

CROSS-REFERENCE TO RELATED APPLICATION

This application is a continuation-in-part of International Application No. PCT/JP2016/050306, filed Jan. 7, 2016, which claims priority from Japanese Patent Application No. 2015-002948, filed on Jan. 9, 2015. This disclosure of the foregoing application is hereby incorporated by reference in its entirety.

BACKGROUND

The present disclosure relates to an information input device capable of acquiring information written by a user, by digitizing a movement trajectory of a writing tool when the user writes on a paper medium using the writing tool.

An information input device is known that can digitize a movement trajectory of a writing tool when the writing tool is used to write on a paper medium placed on a base. For example, an information input device is known that has two housings incorporating a plurality of coils. The information input device is driven using a battery as a power source. The two housings are folded when they are not being used, and are opened to a two-page spread when they are being used. A booklet-like paper medium is placed on the two housings in the two-page spread state. In this state, the information input device applies a current to a plurality of first coils incorporated in the two housings, thus generating an induced magnetic field. An induced current flows through a second coil incorporated in the writing tool, in response to the induced magnetic field generated from the first coils of the information input device. The writing tool generates an induced magnetic field when the induced current flows through the second coil. The information input device uses the plurality of first coils to detect the induced magnetic field generated from the writing tool. Through the above-described processing, the information input device identifies a position of the writing tool.

SUMMARY

In order to suppress consumption of the battery, it is desirable for the information input device to operate in a power-saving mode when the two housings are not being used and are folded. For that purpose, it is necessary for the information input device to detect that the two housings have been folded. In an information input device to which a power source switch is added, an example will be described in which the power source switch is used to notify the information input device that the two housings have been folded. In this case, the user has to manually operate the power source switch, which is troublesome. Further, in an information input device to which a sensor is added, an example will be described in which the information input device uses the sensor to detect that the two housings have been folded. In this case, it is necessary to newly add the sensor to the information input device. Accordingly, a problem arises in that the cost of the information input device increases.

It is an object of the present disclosure to provide an information input device capable of suppressing power consumption when two housings are folded, using a simple structure.

Embodiments provide an information input device that includes a detection portion and a determination portion. The detection portion has two areas in which a plurality of coils is arranged along a plane. The two areas is capable of switching between a folded state in which the areas face each other and a two-page spread state in which the areas do not face each other. The detection portion has a normal state and a power saving state in which current consumption is less than that in the normal state. The detection portion alternately switches between a first state and a second state in the normal state. The first state is a state in which one of the two areas is in a transmission/reception state and, at the same time, the other of the two areas is in a continuous reception state. The second state is a state in which the one of the two areas is in the continuous reception state and, at the same time, the other of the two areas is in the transmission/reception state. The transmission/reception state is a state in which a transmission state and a reception state are alternately switched. The transmission state is a state in which a current is applied to the plurality of coils. The reception state is a state in which an induced current of the plurality of coils is able to be detected. The continuous reception state is a state in which the reception state is maintained. The reception state is a state in which the induced current of the plurality of coils is able to be detected. The determination portion is configured to determine that the detection portion is in the two-page spread state when the induced current is not detected in any of the plurality of coils of the either of the two areas that is in the continuous reception state, and determine that the detection portion is in the folded state when the induced current is detected in any of the plurality of coils of the either of the two areas that is in the continuous reception state. The switching portion is configured to switch the state of the detection portion from the normal state to the power saving state when the determination portion determines that the detection portion is in the folded state.

Embodiments also provide an information input device that includes a detection portion, a processor, and a memory. The detection portion has two areas in which a plurality of coils is arranged along a plane. The two areas is capable of switching between a folded state in which the areas face each other and a two-page spread state in which the areas do not face each other. The detection portion has a normal state and a power saving state in which current consumption is less than that in the normal state. The detection portion alternately switches between a first state and a second state in the normal state. The first state is a state in which one of the two areas is in a transmission/reception state and, at the same time, the other of the two areas is in a continuous reception state. The second state is a state in which the one of the two areas is in the continuous reception state and, at the same time, the other of the two areas is in the transmission/reception state. The transmission/reception state is a state in which a transmission state and a reception state are alternately switched. The transmission state is a state in which a current is applied to the plurality of coils. The reception state is a state in which an induced current of the plurality of coils is able to be detected. The continuous reception state is a state in which the reception state is maintained. The reception state is a state in which the induced current of the plurality of coils is able to be detected. The memory is configured to store computer-readable instructions. The computer-readable instructions causing the processor to perform processes include determining that the detection portion is in the two-page spread state when the induced current is not detected in any of the plurality of coils of the either of the two areas that is in the continuous reception state, and that the detection portion is in the folded state when the induced current is detected in any of the plurality of coils of the either of the two areas that is in the continuous reception state, and switching the state of the detection portion from the normal state to the power saving state when it is determined that the detection portion is in the folded state.

BRIEF DESCRIPTION OF THE DRAWINGS

Embodiments of the disclosure will be described below in detail with reference to the accompanying drawings in which.

DETAILED DESCRIPTION OF EMBODIMENTS

Embodiments of the present disclosure will be explained with reference to the drawings. Note that the drawings are used to explain technological features that can be adopted by the present disclosure, and are not intended to limit the content. An outline of a handwriting input system 1 according to the present embodiment will be explained with reference to FIG. 1 and FIG. 2. In the explanation below, the upper left side, the lower right side, the upper side, the lower side, the upper right side and the lower left side of FIG. 1 are respectively defined as the left side, the right side, the front side, the rear side, the upper side and the lower side of a reading device 2.

Figure 1:
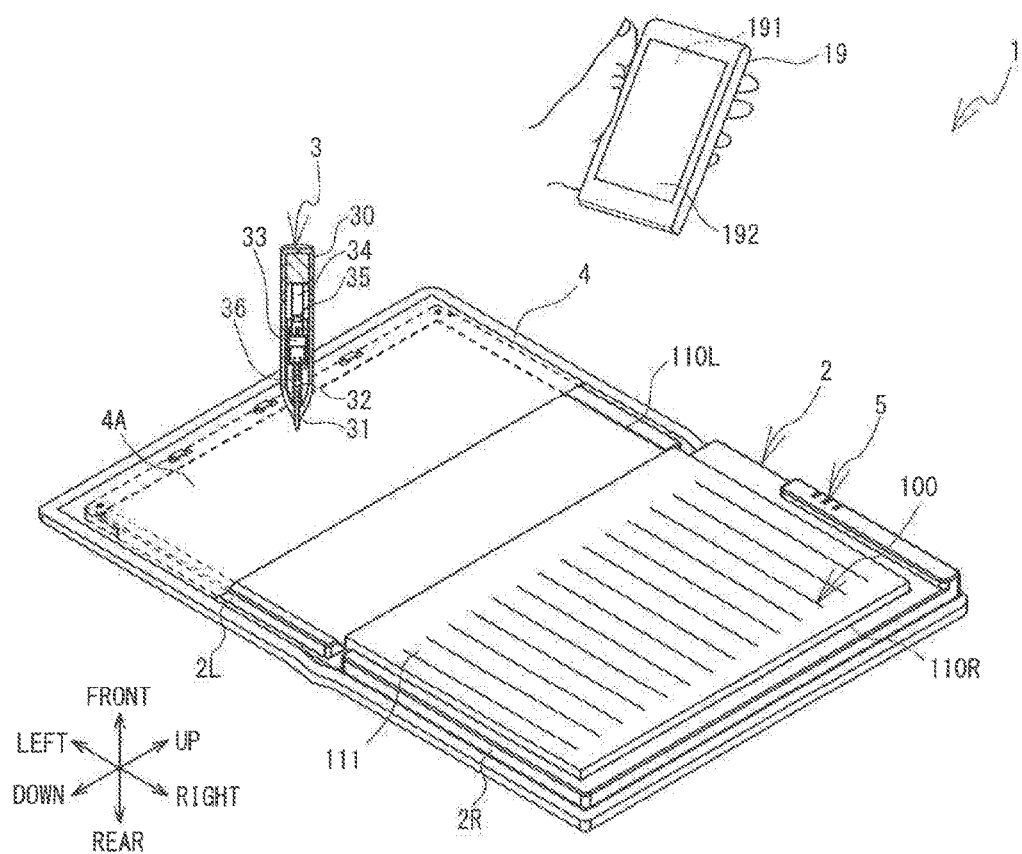
FIG. 1 is a diagram showing an outline of a handwriting input system 1.

As shown in FIG. 1, the handwriting input system 1 is mainly provided with the reading device 2, an electronic pen 3, a smart phone 19 and the like. The reading device 2 is a thin and light-weight handwriting input device that can be folded. In the handwriting input system 1, a user uses the electronic pen 3 to write a line drawing on each of a plurality of paper sheets 111 of a paper medium 100 mounted on the reading device 2. The reading device 2 acquires a plurality of positions of the electronic pen 3 in the course of writing.

The smart phone 19 acquires the plurality of positions identified by the reading device 2. Based on the acquired positions, the smart phone 19 identifies the line drawing written on each of the plurality of paper sheets 111 by the electronic pen 3. The smart phone 19 creates image files of images including at least the identified line drawings.

The user of the smart phone 19 inputs an operation that selects one of the created image files, via a touch panel 191. The smart phone 19 displays, on a display 192, an image corresponding to the selected image file. Via the display 192, the user can visually recognize an image including a line drawing having the same shape as the line drawing written on each of the plurality of paper sheets 111 using the electronic pen 3.

Figure 2:
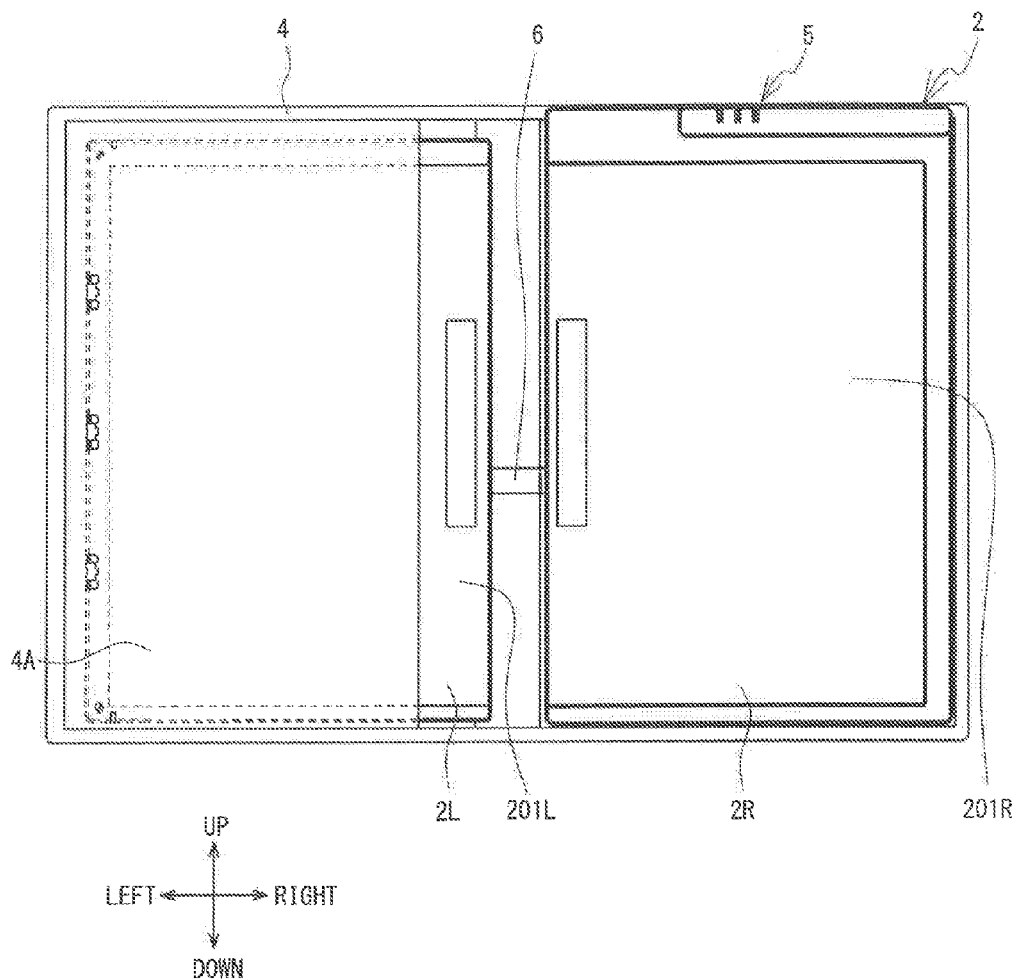
FIG. 2 is a plan view of a reading device 2.

As shown in FIG. 2, the reading device 2 is mainly configured by a left and right pair of a left reading device 2L and a right reading device 2R, a flat cable 6 and a cover 4. The left reading device 2L and the right reading device 2R have a rectangular thin plate shape. The left reading device 2L and the right reading device 2R are arranged on the front surface of the cover 4 such that they can be opened to a two-page spread in the left-right direction. The left reading device 2L and the right reading device 2R are electrically connected by the flat cable 6. When the flat cable 6 bends or extends, the state of the left reading device 2L and the right reading device 2R can be changed between a folded state, which is a state in which they face each other, and a two-page spread state, which is a state in which they do not face each other. The left reading device 2L and the right reading device 2R are put into the two-page spread state when they are being used, and are put into the folded state when they are not being used. In the two-page spread state, the left reading device 2L and the right reading device 2R are arranged side by side in the left-right direction. Three LEDs 5 are provided on the upper edge of the right reading device 2R. The LEDs 5 can notify the state of the reading device 2 to the user. A bag-shaped bag portion 4A is provided on the left side of the cover 4. The left reading device 2L is detachably mounted on the cover 4 by being inserted into the bag portion 4A. The right reading device 2R is adhered to the front surface on the right side of the cover 4 using a resin film or the like.

As shown in FIG. 1, the paper medium 100 is detachably mounted on the front surface of the reading device 2 when the left reading device 2L and the right reading device 2R are in the two-page spread state. The paper medium 100 is like a booklet, and can be opened to a two-page spread. The paper medium 100 is provided with a pair of cover sheets (a front cover sheet 110L and a back cover sheet 110R) and the plurality of paper sheets 111. The front cover sheet 110L, the back cover sheet 110R and the plurality of paper sheets 111 each have a rectangular shape. The front cover sheet 110L, the back cover sheet 110R and the plurality of paper sheets 111 are bound on one side thereof that extends in the longitudinal direction. A bound portion of the plurality of paper sheets 111 extends in the up-down direction. For example, the paper medium 100 is an A5 size notebook.

The paper medium 100 is placed on a detection area 201L (refer to FIG. 2) on which the front cover sheet 110L becomes the front surface of the left reading device 2L. The paper medium 100 is placed on a detection area 201R (refer to FIG. 2) on which the back cover sheet 110R becomes the front surface of the right reading device 2R. In the above-described manner, the paper medium 100 is mounted on the reading device 2 when the left reading device 2L and the right reading device 2R are in the two-page spread state. The paper medium 100 is mounted using an adhesive tape or the like in a state in which a position of the paper medium 100 on the reading device 2 is determined. The user can write a line drawing on each of the plurality of paper sheets 111 of the paper medium 100, using the electronic pen 3.

The electronic pen 3 is a known electromagnetic induction-type electronic pen. The electronic pen 3 is mainly provided with a cylindrical body 30, a core body 31, a coil 32, a variable-capacitance capacitor 33, a board 34, a capacitor 35 and an ink storage portion 36. The cylindrical body 30 has a columnar shape. The cylindrical body 30 internally houses a part of the core body 31, the coil 32, the variable-capacitance capacitor 33, the board 34, the capacitor 35 and the ink storage portion 36. The core body 31 is provided on a leading end portion of the electronic pen 3. The core body 31 is urged to the leading end side of the electronic pen 3 by an elastic member (not shown in the drawings). A leading end portion of the core body 31 protrudes to the outside of the cylindrical body 30. The rear end side of the core body 31 is connected to the ink storage portion 36 in which ink is stored. The ink storage portion 36 supplies the ink to the core body 31. When the user writes on each of the plurality of paper sheets 111 using the electronic pen 3, a line drawing is formed on each of the plurality of paper sheets 111 by the ink.

The coil 32 is held between the core body 31 and the variable-capacitance capacitor 33 in a state in which the coil 32 is wound around the ink storage portion 36. The variable-capacitance capacitor 33 is fixed to an inner portion of the electronic pen 3 by the board 34. The capacitor 35 is mounted on the board 34. The capacitor 35 and the variable-capacitance capacitor 33 are connected in parallel to the coil 32, and form a known resonance circuit.

The smart phone 19 is provided with the touch panel 191 and the display 192. The touch panel 191 is used to input various commands The display 192 can display an image corresponding to the image file. A general-purpose PC or a tablet PC may be used instead of the smart phone 19.

Figure 3:
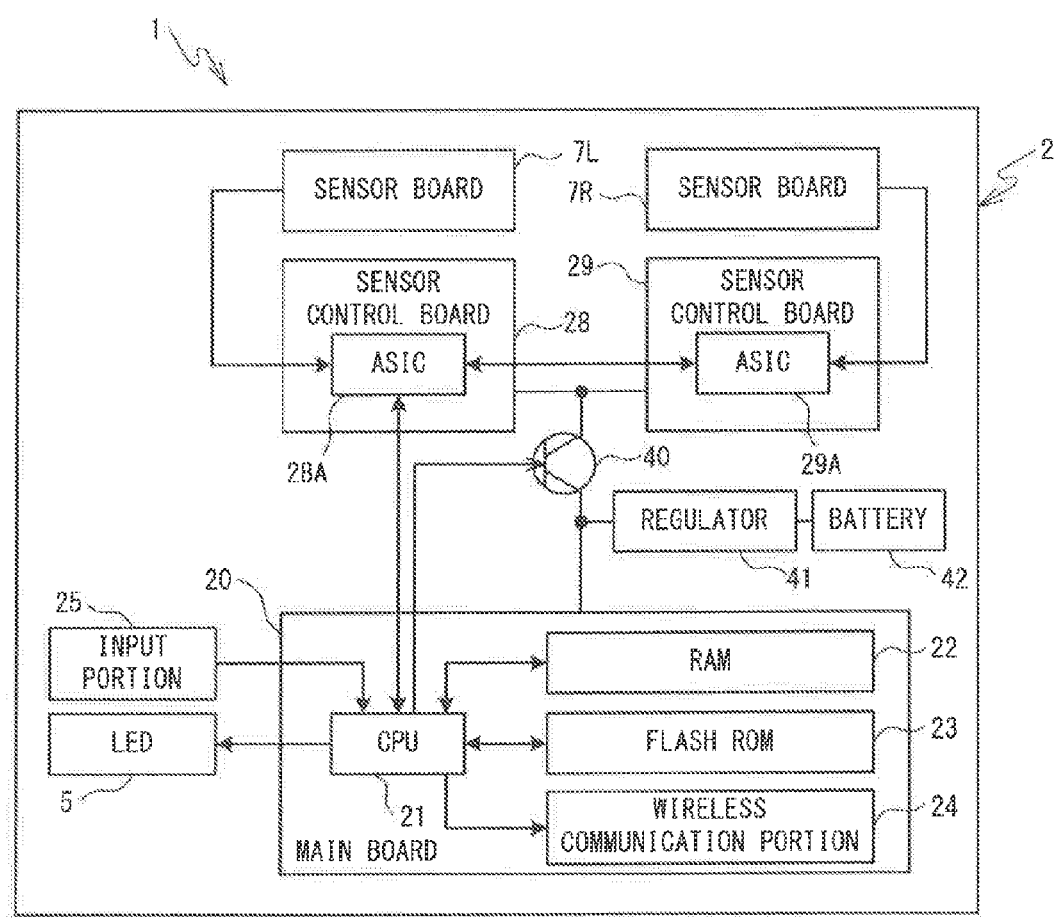
FIG. 3 is a block diagram showing an electrical configuration of the reading device 2.

An electrical configuration of the reading device 2 and an outline of the principle used by the reading device 2 to detect coordinate data will be explained with reference to FIG. 3. The reading device 2 is provided with sensor boards 7L and 7R, a main board 20, sensor control boards 28 and 29, an input portion 25, the three LEDs 5, a transistor 40, a regulator 41 and a battery 42. The sensor board 7L is provided inside the left reading device 2L, in a position corresponding to the detection area 201L (refer to FIG. 2). The sensor board 7R is provided inside the right reading device 2R, in a position corresponding to the detection area 201R (refer to FIG. 2). In a state in which the left reading device 2L and the right reading device 2R are in the two-page spread state, the sensor boards 7L and 7R are also in a two-page spread state. In a state in which the left reading device 2L and the right reading device 2R are folded, the sensor boards 7L and 7R are also in a folded state. Hereinafter, the state in which the sensor boards 7L and 7R are folded will be referred to as the "folded state," and the state in which the sensor boards 7L and 7R are opened to a two-page spread will be referred to as the "two-page spread state." The input portion 25 and the three LEDs 5 are provided on the right reading device 2R. Colors of the three LEDs 5 are yellow, green and red, respectively.

The main board 20 is provided with a CPU 21, a RAM 22, a flash ROM 23 and a wireless communication portion 24. The RAM 22, the flash ROM 23 and the wireless communication portion 24 are electrically connected to the CPU 21. The CPU 21 performs control of the reading device 2. The RAM 22 temporarily stores various data, such as operation data.

The flash ROM 23 stores stroke data. Further, the flash ROM 23 stores programs to be executed by the CPU 21 to control the reading device 2. The reading device 2 can receive a program from a network or an external device (not shown in the drawings) capable of communicating via the wireless communication portion 24 that will be described later, and can install the received program into the flash ROM 23. The reading device 2 may be provided with a medium reading device (a memory card slot, for example) that is not shown in the drawings. The reading device 2 may use the medium reading device to read the program stored in a storage medium (a memory card, for example), and may install the read program into the flash ROM 23.

The wireless communication portion 24 is a controller to perform near-field wireless communication with an external electronic device. Bluetooth® is a specific example of a near-field wireless communication standard. The input portion 25 and the three LEDs 5 are electrically connected to the CPU 21. The input portion 25 is a switch to input a command to the reading device 2.

A plurality of long and thin loop coils are arranged on the sensor boards 7L and 7R in both the up-down direction and the left-right direction. The sensor board 7L is electrically connected to an ASIC 28A of a sensor control board 28. The ASIC 28A controls application of a current to the plurality of loop coils of the sensor board 7L. The sensor board 7R is electrically connected to an ASIC 29A of a sensor control board 29. The ASIC 29A controls application of a current to the plurality of loop coils of the sensor board 7R. The ASIC 28A operates as a master, and the ASIC 29A operates as a slave. The ASIC 28A is directly connected to the CPU 21. The ASIC 29A is connected to the ASIC 28A. A ROM (not shown in the drawings), in which programs are stored, is built into each of the ASICs 28A and 29A.

The battery 42 is a power source to drive the main board 20 and the sensor control boards 28 and 29. The regulator 41 stabilizes the voltage of the battery 42. The power of the battery 42 whose voltage is stabilized by the regulator 41 is directly supplied to the main board 20. Further, the power of the battery 42 stabilized by the regulator 41 is supplied to the sensor control boards 28 and 29 via the transistor 40. The transistor 40 can control ON/OFF of the power supply to the sensor control boards 28 and 29. The CPU 21 is connected to a base of the transistor 40. The CPU 21 can use the transistor 40 to switch the ON/OFF of the power supply to the sensor control boards 28 and 29.

An outline of an operation principle to detect the position of the electronic pen 3 when a writing operation is performed using the electronic pen 3 on the left reading device 2L including the sensor board 7L or on the right reading device 2R including the sensor board 7R will be explained. The reading device 2 is used when the sensor boards 7L and 7R are in the two-page spread state. The ASICs 28A and 29A apply a current of a specific frequency to each one of the plurality of loop coils of each of the sensor boards 7L and 7R. With the above-described processing, magnetic fields are generated from the loop coils to which the current has been applied.

The plurality of loop coils of each of the sensor boards 7L and 7R are divided into a plurality of areas each having a specific size. Hereinafter, the plurality of loop coils included in each of the areas will be referred to as a "coil group." The application of the current is performed simultaneously for the plurality of loop coils included in the coil group, and performed sequentially for each of the plurality of coil groups. For example, the ASIC 28A selects one of the plurality of coil groups of the sensor board 7L. The ASIC 28A applies a current to the plurality of loop coils included in the selected coil group, and thereafter stops the current. The ASIC 29A selects one of the plurality of coil groups of the sensor board 7R. The ASIC 29A applies a current to the plurality of loop coils included in the selected coil group, and thereafter stops the current. The ASICs 28A and 29A sequentially select one of the plurality of coil groups, and repeat the application and stopping of the current to the plurality of loop coils included in the selected coil group. With the above-described processing, magnetic fields are generated from the plurality of loop coils included in the coil group to which the current has been applied.

An example will be described in which the user performs an operation of writing a line drawing on the paper sheet 111 on the left reading device 2L using the electronic pen 3, in a state in which a current is applied to the plurality of loop coils included in a specific coil group of the sensor board 7L. In accordance with the writing operation, the electronic pen 3 comes close to the sensor board 7L. The resonance circuit of the electronic pen 3 resonates due to electromagnetic induction, and generates an induced magnetic field.

After the ASIC 28A stops the application of the current to the plurality of loop coils included in the specific coil group of the sensor board 7L, the ASIC 28A detects an induced current that flows through the plurality of loop coils of the sensor board 7L due to the induced magnetic field generated from the electronic pen 3. The ASIC 28A amplifies the detected induced current. The ASIC 28A performs amplitude detection on the detected induced current. After that, the detected induced current is output to the CPU 21 as a detection result. Based on the detection result output from the ASIC 28A, the CPU 21 detects the position of the electronic pen 3 on the left reading device 2L.

Further, when the operation of writing a line drawing is being performed using the electronic pen 3 with respect to the paper sheet 111 on the left reading device 2L including the sensor board 7L, a writing pressure is applied to the core body 31. An inductance of the coil 32 changes in response to the writing pressure applied to the core body 31. The resonance frequency of the resonance circuit of the electronic pen 3 changes in response to the writing pressure applied to the core body 31. The CPU 21 detects the change (phase change) of the resonance frequency, and determines whether or not the electronic pen 3 is in contact with each of the plurality of paper sheets 111 of the paper medium 100. The CPU 21 can determine whether a line drawing is being written on each of the plurality of paper sheets 111 of the paper medium 100.

When the user performs the operation of writing, using the electronic pen 3, a line drawing on the paper sheet 111 on the right reading device 2R, the same processing as described above is performed by the ASIC 29A and the sensor board 7R. With the above-described processing, the CPU 21 detects the position of the electronic pen 3 on the right reading device 2R, and determines whether or not a line drawing is being written by the electronic pen 3.

The timing at which the application of the current to the plurality of loop coils is switched between the sensor boards 7L and 7R will be explained with reference to FIG. 4. First, the ASIC 28A selects one of the plurality of coil groups of the sensor board 7L. The ASIC 28A applies a current to the plurality of loop coils included in the selected coil group, and thereafter stops the current application. While sequentially changing the coil group to be selected, the ASIC 28A repeats the application and stopping of the current to the plurality of loop coils included in the selected coil group. The ASIC 28A determines whether or not the induced current has been detected by one of the plurality of loop coils of the sensor board 7L. The above-described processing is repeatedly performed until all the plurality of coil groups of the sensor board 7L have been selected (a). Hereinafter, in the sensor boards 7L and 7R, a state in which the current is applied to the plurality of loop coils included in the selected coil group will be referred to as a "transmission state." In the sensor boards 7L and 7R, a state in which the application of the current to the plurality of loop coils included in the selected coil group is stopped and the induced current can be detected will be referred to as a "reception state." In the sensor boards 7L and 7R, a state in which the transmission state and the reception state are alternately switched will be referred to as a "transmission/reception state."

Figure 4:
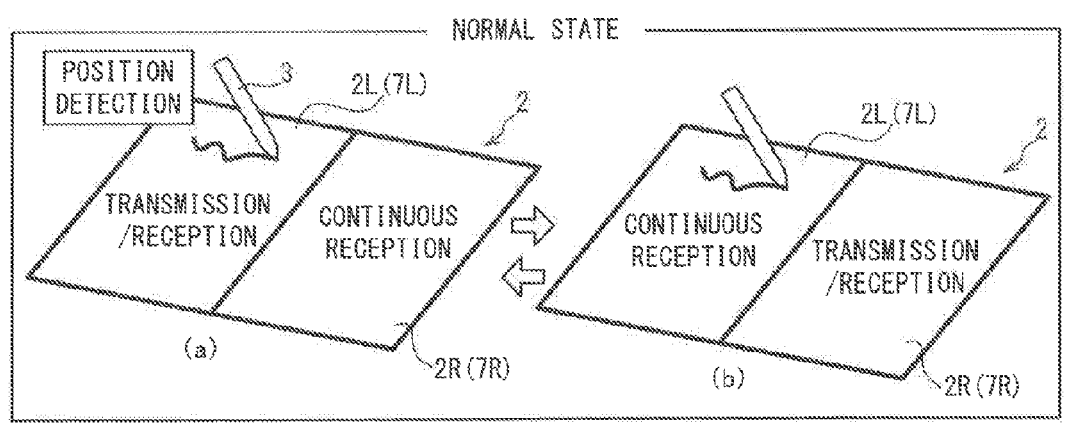
FIG. 4 is a diagram showing the reading device 2 in a normal state.

FIG. 4 (a) shows that the sensor board 7L is in the transmission state. When an induced magnetic field is generated from the electronic pen 3 in response to the magnetic field generated from the plurality of loop coils included in the coil group in the transmission state, the sensor board 7L detects an induced current generated in one of the plurality of loop coils in the reception state. Based on a detection result output from the ASIC 28A, the CPU 21 detects the position of the electronic pen 3 on the left reading device 2L.

On the other hand, when the ASIC 28A is controlling the sensor board 7L to be in the transmission/reception state, the ASIC 29A stops the application of the current to the plurality of loop coils and maintains a state in which the induced current can be detected. Hereinafter, in the sensor boards 7L and 7R, a state in which the current application to the plurality of loop coils is stopped and the induced current detectable state is maintained will be referred to as a "continuous reception state." FIG. 4 (a) shows that the sensor board 7R is in the continuous reception state.

An example will be described in which the writing operation by the electronic pen 3 is performed on the paper sheet 111 on the right reading device 2R including the sensor board 7R in the continuous reception state, while in the state shown in FIG. 4 (a). In this case, no magnetic field is generated from the plurality of loop coils of the sensor board 7R, and therefore, the induced magnetic field is also not generated from the electronic pen 3 that has come close to the sensor board 7R. As a result, the induced current does not flow through the plurality of loop coils of the sensor board 7R, and therefore, the CPU 21 cannot detect the position of the electronic pen 3.

To address this, by controlling the sensor board 7L and controlling the ASIC 29A, the ASIC 28A alternately switches between the state (a) in which the sensor board 7L is in the transmission/reception state and the sensor board 7R is in the continuous reception state, and a state (b) in which the sensor board 7L is in the continuous reception state and the sensor board 7R is in the transmission/reception state. With the above-described processing, the sensor boards 7L and 7R are alternately brought into the transmission/reception state, in which the position of the electronic pen 3 can be detected. With the above-described processing, regardless of whether the writing operation by the electronic pen 3 is performed on the paper sheet 111 on the left reading device 2L or the right reading device 2R, the CPU 21 can detect the position of the electronic pen 3 and can determine that a line drawing is being written. Hereinafter, a state in which the state (a) in which the sensor board 7L is in the transmission/reception state and the sensor board 7R is in the continuous reception state and the state (b) in which the sensor board 7L is in the continuous reception state and the sensor board 7R is in the transmission/reception state are alternately switched will be referred to as a "normal state."

Figure 5:
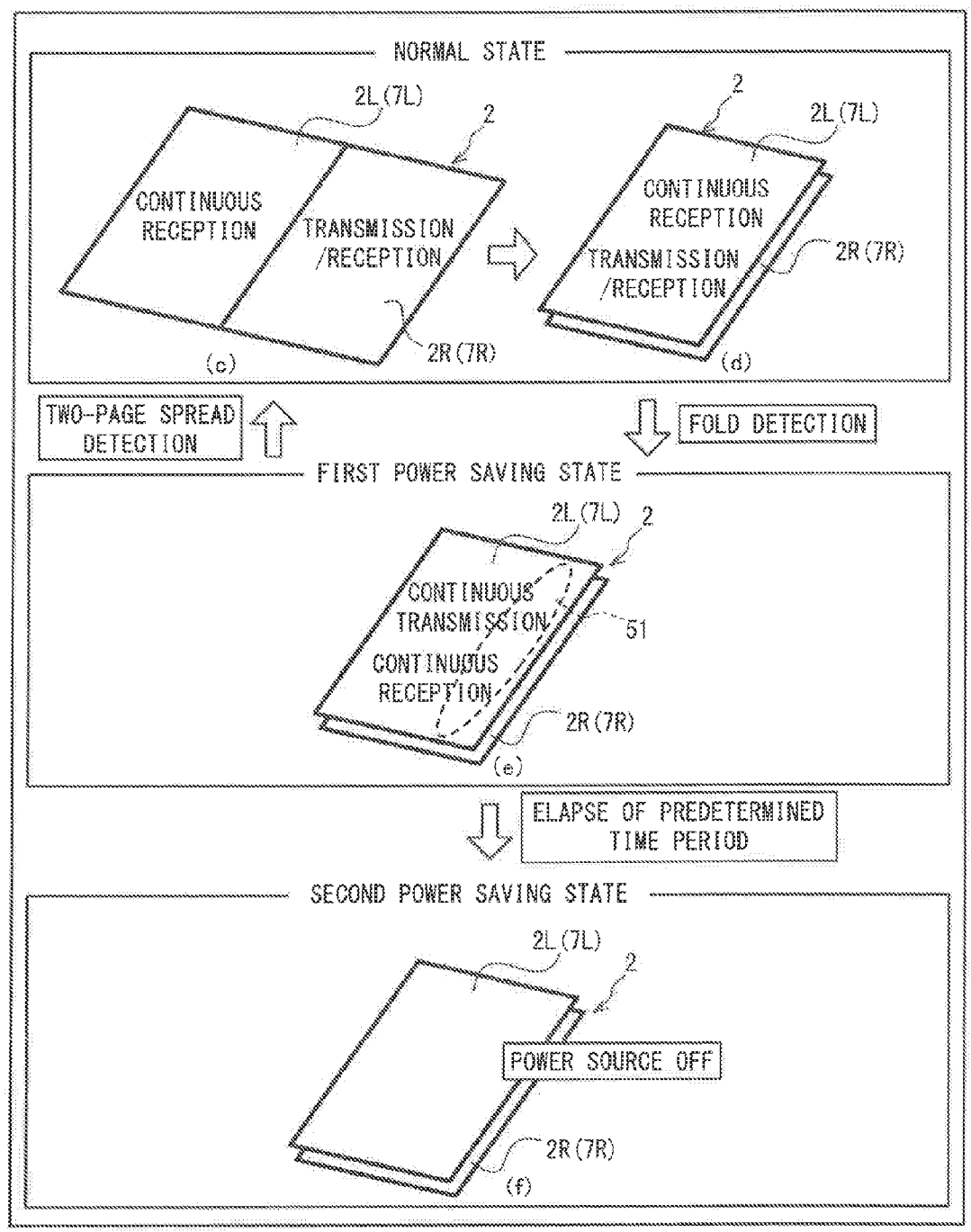
FIG. 5 is a diagram showing the reading device 2 in the normal state, a first power saving state and a second power saving state.

Operations when the sensor boards 7L and 7R change between a two-page spread state (c) and folded states (d) to (f) will be explained with reference to FIG. 5. In the case of the two-page spread state (c), no magnetic field is generated from the plurality of loop coils of the sensor board 7L in the continuous reception state, for example, and the induced magnetic field is also not generated from the electronic pen 3. Therefore, the induced current does not flow through the plurality of loop coils of the sensor board 7L. In contrast to this, an example will be described in which, as shown by (d), the sensor boards 7L and 7R are in the folded state and the sensor board 7L in the continuous reception state is overlaid on the sensor board 7R in the transmission/reception state. In this case, the magnetic field that is generated in response to the application of the current to the plurality of loop coils of the sensor board 7R acts on the plurality of loop coils of the sensor board 7L, and the induced current flows. When the ASIC 28A detects that the induced current is flowing through the plurality of loop coils of the sensor board 7L in the continuous reception state, the ASIC 28A determines that the sensor boards 7L and 7R are in the folded state.

In contrast to the case (d), when the sensor board 7L in the transmission/reception state is overlaid on the sensor board 7R in the continuous reception state, the magnetic field that is generated in response to the application of the current to the plurality of loop coils of the sensor board 7L acts on the plurality of loop coils of the sensor board 7R, and the induced current flows. When the ASIC 29A detects that the induced current is flowing through the plurality of loop coils of the sensor board 7R in the continuous reception state, the ASIC 29A outputs a notification signal to the ASIC 28A. Hereinafter, the notification signal that is output from the ASIC 29A to the ASIC 28A when it is detected that the induced current is flowing through the plurality of loop coils of the sensor board 7R in the continuous reception state will be referred to as a "current detection signal." When the ASIC 28A detects the current detection signal output from the ASIC 29A, the ASIC 28A determines that the sensor boards 7L and 7R are in the folded state.

When the ASIC 28A determines that the sensor boards 7L and 7R are in the folded state, the ASIC 28A applies a current to, among the plurality of coil groups of the sensor board 7L, a coil group 51 only, which is arranged on a side separated from the sensor board 7R in the two-page spread state. Hereinafter, in the sensor board 7L, a state in which the current is applied to the coil group 51 only will be referred to as a "continuous transmission state."

The timing at which the current is applied to the coil group 51 when the sensor board 7L is in the continuous transmission state is the same as the timing at which the current is applied to the coil group 51 when the sensor board 7L is in the transmission/reception state. In other words, in the sensor board 7L, during a period in which the current is applied to the plurality of coil groups other than the coil group 51 in the transmission/reception state, the current is not applied in the continuous transmission state. In the sensor board 7L, the current is applied in the continuous transmission state only at the timing at which the current is applied to the coil group 51 in the transmission/reception state. In other words, in the continuous transmission state, the current is intermittently applied to the coil group 51, and the magnetic field is generated intermittently. Therefore, the power consumption of the sensor board 7L is smaller in the continuous transmission state than in the transmission state, by the amount of the current applied to the plurality of coil groups other than the coil group 51.

In a state in which the sensor board 7L is caused to operate in the continuous transmission state, the ASIC 28A outputs a control signal to the ASIC 29A. Hereinafter, the control signal that is output from the ASIC 28A to the ASIC 29A in the state in which the sensor board 7L is caused to operate in the continuous transmission state will be referred to as a "first control signal." When the ASIC 29A detects the first control signal output from the ASIC 28A, the ASIC 29A causes the sensor board 7R to operate in the continuous reception state.

When the sensor boards 7L and 7R are maintained in the folded state, the magnetic field that is generated intermittently in response to the current application to the coil group 51 of the sensor board 7L acts on the plurality of loop coils of the sensor board 7R, and the induced current flows. When the ASIC 29A detects that the induced current is flowing through the plurality of loop coils of the sensor board 7R in the continuous reception state, the ASIC 29A outputs the current detection signal to the ASIC 28A. When the ASIC 28A detects the current detection signal output from the ASIC 29A, the ASIC 28A causes the sensor board 7L to continuously operate in the continuous transmission state. Hereinafter, a state in which the sensor board 7L operates in the continuous transmission state and the sensor board 7R operates in the continuous reception state will be referred to as a "first power saving state."

When the sensor boards 7L and 7R are changed from the folded state (e) to the two-page spread state (c), the magnetic field that is generated in the coil group 51 of the sensor board 7L in the continuous transmission state does not act on the plurality of loop coils of the sensor board 7R in the continuous reception state. As a result, the induced current does not flow through the plurality of loop coils of the sensor board 7R. When the ASIC 29A detects that the induced current does not flow through the plurality of loop coils of the sensor board 7R, the ASIC 29A stops the output of the current detection signal to the ASIC 28A. When the current detection signal is not detected, the ASIC 28A determines that the sensor boards 7L and 7R are in the two-page spread state. In this case, the ASIC 28A returns the state of the sensor boards 7L and 7R from the first power saving state to the normal state. Specifically, by controlling the sensor board 7L and controlling the ASIC 29A, the ASIC 28A alternately switches between the state (a) (refer to FIG. 4) in which the sensor board 7L is in the transmission/reception state and the sensor board 7R is in the continuous reception state, and the state (b) (refer to FIG. 4) or (c) (refer to FIG. 5) in which the sensor board 7L is in the continuous reception state and the sensor board 7R is in the transmission/reception state When the CPU 21 determines that the state in which the ASIC 28A causes the sensor boards 7L and 7R to operate in the first power saving state has continued for a predetermined time period or more, the CPU 21 controls the transistor 40 and turns off the power that is supplied from the battery 42 to the sensor control boards 28 and 29 via the regulator 41 (f). With the above-described processing, the power is not supplied to the ASICs 28A and 29A, and all the application of the current to the plurality of loop coils of each of the sensor boards 7L and 7R is stopped. The power consumption of the sensor board 7L becomes further smaller than in the continuous transmission state, by the amount of the current applied to the coil group 51 in the continuous transmission state. Further, the power consumed by the ASICs 28A and 29A is also suppressed. Hereinafter, a state in which all the application of the current to the plurality of loop coils of each of the sensor boards 7L and 7R is stopped will be referred to as a "second power saving state."

Figure 6:
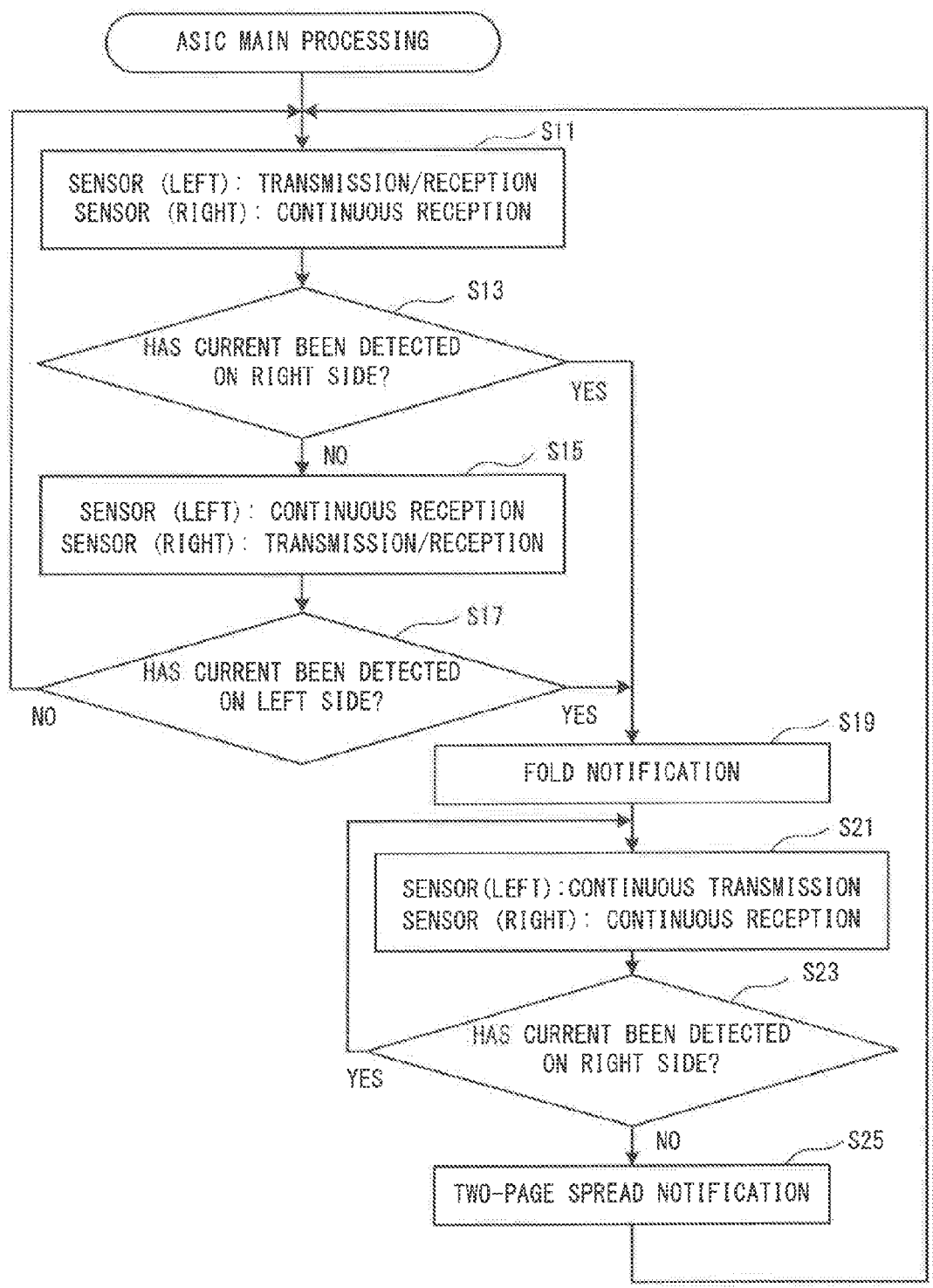
FIG. 6 is a flowchart of ASIC main processing.

ASIC main processing that is performed by the ASIC 28A will be explained with reference to FIG. 6. When the power supply to the ASIC 28A is started, the ASIC main processing is started by the ASIC 28A executing the program stored in the ROM (not shown in the drawings) built into the ASIC 28A. The power supply to the ASIC 28A is turned on when the CPU 21 performs processing at step S41 (refer to FIG. 7), and is turned off when the CPU 21 performs processing at step S51 (refer to FIG. 7). In summary, the CPU 21 controls the timing of the ASIC main processing performed by the ASIC 28A. Details will be described later.

The ASIC 28A causes the sensor board 7L to operate in the transmission/reception state (step S11). In order to cause the sensor board 7R to operate in the continuous reception state, the ASIC 28A outputs the first control signal to the ASIC 29A (step S11). When the ASIC 29A detects the first control signal, the ASIC 29A causes the sensor board 7R to operate in the continuous reception state (refer to FIG. 4 (*a*)).

The ASIC 28A determines whether or not the induced current is flowing through the plurality of loop coils of the sensor board 7R in the continuous reception state, based on whether or not the current detection signal output from the ASIC 29A has been detected. When the current detection signal has been detected, the ASIC 28A determines that the induced current is flowing through the plurality of loop coils of the sensor board 7R (yes at step S13). In this case, the ASIC 28A advances the processing to step S19.

On the other hand, when the current detection signal has not been detected, the ASIC 28A determines that the induced current is not flowing through the plurality of loop coils of the sensor board 7R (no at step S13). In this case, the ASIC 28A causes the sensor board 7L to operate in the continuous reception state (step S15). In order to cause the sensor board 7R to operate in the transmission/reception state, the ASIC 28A outputs a control signal to the ASIC 29A (step S15). Hereinafter, the control signal that is transmitted from the ASIC 28A to the ASIC 29A in order to cause the sensor board 7R to operate in the transmission/reception state will be referred to as a "second control signal." When the ASIC 29A detects the second control signal, the ASIC 29A causes the sensor board 7R to operate in the transmission/reception state (refer to FIG. 4 (b) and FIG. 5 (c) and (d)).

The ASIC 28A determines whether or not the induced current is flowing through the plurality of loop coils of the sensor board 7L in the continuous reception state. When the ASIC 28A determines that the induced current is flowing through the plurality of loop coils of the sensor board 7L (yes at step S17), the ASIC 28A advances the processing to step S19. On the other hand, when the ASIC 28A determines that the induced current is not flowing through the plurality of loop coils of the sensor board 7L (no at step S17), the ASIC 28A returns the processing to step S11. The states of the sensor boards 7L and 7R when the processing at step S11 and step S15 has been performed correspond to the normal state (refer to FIG. 4 (a) and (b) and FIG. 5 (c) and (d)).

When the ASIC 28A determines that the induced current is flowing in the sensor boards 7L and 7R in the continuous reception state (yes at step S13 and yes at step S17), the ASIC 28A outputs a signal to the CPU 21 in order to notify that the sensor boards 7L and 7R are in the folded state (step S19). Hereinafter, the signal to notify that the sensor boards 7L and 7R are in the folded state will be referred to as a "fold notification signal."

The ASIC 28A causes the sensor board 7L to operate in the continuous transmission state (step S21). In order to cause the sensor board 7R to operate in the continuous reception state, the ASIC 28A outputs the first control signal to the ASIC 29A (step S21). When the ASIC 29A detects the first control signal, the ASIC 29A causes the sensor board 7R to operate in the continuous reception state (refer to FIG. 5 (e)). The sensor boards 7L and 7R when the processing at step S21 has been performed correspond to the first power saving state.

The ASIC 28A determines whether or not the induced current is flowing through the plurality of loop coils of the sensor board 7R in the continuous reception state, based on whether or not the current detection signal output from the ASIC 29A has been detected. When the current detection signal has been detected, the ASIC 28A determines that the induced current is flowing through the plurality of loop coils of the sensor board 7R (yes at step S23). In this case, the ASIC 28A returns the processing to step S21. On the other hand, when the current detection signal has not been detected, the ASIC 28A determines that the induced current is not flowing through the plurality of loop coils of the sensor board 7R (no at step S23). In this case, the ASIC 28A outputs a signal to the CPU 21 in order to notify that the sensor boards 7L and 7R are in the two-page spread state (step S25). Hereinafter, the signal to notify that the sensor boards 7L and 7R are in the two-page spread state will be referred to as a "two-page spread notification signal." The ASIC 28A returns the processing to step S11.

Note that, in parallel to the above-described ASIC main processing, the ASIC 28A performs processing (not shown in the drawings) to detect the position of the electronic pen 3. In this processing, in a case where the sensor boards 7L and 7R operate in the normal state, when the induced current flowing through the plurality of loop coils of the sensor boards 7L and 7R in the transmission/reception state is detected, a detection result is output to the CPU 21.

CPU main processing that is performed by the CPU 21 will be explained with reference to FIG. 7. When the power supply to the CPU 21 is started, the CPU main processing is started by the CPU 21 executing the program stored in the flash ROM 23. The CPU 21 controls the voltage of a signal to be output to the transistor 40, and turns on the power supply to the sensor control boards 28 and 29. With the above-described processing, the power is supplied to the ASICs 28A and 29A (step S41). The ASIC 28A starts the ASIC main processing (refer to FIG. 6). The reading device 2 starts to operate in the normal state.

The CPU 21 determines whether or not the fold notification signal output from the ASIC 28A has been detected (step S43). When it is determined that the fold notification signal has not been detected (no at step S43), the CPU 21 returns the processing to step S43. When it is determined that the fold notification signal has been detected (yes at step S43), the CPU 21 determines whether or not the two-page spread notification signal has been received (step S45). When it is determined that the two-page spread notification signal has been detected (yes at step S45), the CPU 21 returns the processing to step S43.

When it is determined that the two-page spread notification signal has not been detected (no at step S45), the CPU 21 determines whether or not a predetermined time period has elapsed from when the fold notification signal was detected by the processing at step S43 (step S49). When it is determined that the predetermined time period has not elapsed (no at step S49), the CPU 21 returns the processing to step S45.

When it is determined that, after the fold notification signal has been detected by the processing at step S43, the predetermined time period has elapsed (yes at step S49) without detecting the two-page spread notification signal (no at step S45), the CPU 21 controls the voltage of the signal to be output to the transistor 40 and turns off the power supply to the sensor control boards 28 and 29. With the above-described processing, the power supply to the ASICs 28A and 29A is turned off (step S51). The ASIC 28A stops the ASIC main processing (refer to FIG. 6). The application of the current to the plurality of loop coils of the sensor boards 7L and 7R is stopped. The state of the sensor boards 7L and 7R when the processing at step S51 has been performed corresponds to the second power saving state (refer to FIG. 5 (f)).

The CPU 21 determines whether or not the operation to turn on the power source of the reading device 2 has been detected via the input portion 25 (step S53). When it is determined that the operation to turn on the power source has not been detected (no at step S53), the CPU 21 returns the processing to step S53. When it is determined that the operation to turn on the power source has been detected (yes at step S53), the CPU 21 returns the processing to step S41. The CPU 21 controls the voltage of the signal to be output to the transistor 40, and turns on the power supply to the sensor control boards 28 and 29 (step S41). When the CPU 21 performs the processing at step S41, the sensor boards 7L and 7R restart the operation in the normal state. The CPU 21 repeats the processing.

Note that, in parallel to the above-described CPU main processing, the CPU 21 performs processing (not shown in the drawings) to detect the position of the electronic pen 3. In this processing, based on a detection result output from the ASIC 28A, the position of the loop coil that has detected the electronic pen 3 is identified, and the position of the electronic pen 3 is detected. Further, it is determined whether or not the electronic pen 3 is in contact with the paper sheet 111, based on a change in the resonance frequency. With the above-described processing, it is determined whether or not a line drawing is being written on the paper sheet 111. When it is determined that the line drawing is being written, coordinate data indicating the position of the electronic pen 3 is stored in the flash ROM 23.

As explained above, the reading device 2 generates the induced magnetic field from the plurality of loop coils of the sensor boards 7L and 7R in the transmission state. The induced magnetic field causes the coil 32 incorporated into the electronic pen 3 to generate the induced current. The electronic pen 3 generates the induced magnetic field based on the induced current generated in the coil 32. The induced magnetic field generated from the electronic pen 3 causes the plurality of loop coils of the sensor boards 7L and 7R in the reception state to generate the induced current. The CPU 21 identifies the position of the electronic pen 3 based on the position of the loop coil that has generated the induced current, among the plurality of loop coils of the sensor boards 7L and 7R. The ASIC 28A alternately switches between the state in which the sensor board 7L is in the transmission/reception state and the sensor board 7R is in the continuous reception state, and the state in which the sensor board 7L is in the continuous reception state and the sensor board 7R is in the transmission/reception state. The CPU 21 can detect the position of the electronic pen 3 over the whole of the left reading device 2L and the right reading device 2R.

When the sensor boards 7L and 7R are in the two-page spread state, the induced current does not flow thorough the plurality of coils in the continuous reception state. Therefore, when the induced current does not flow through the plurality of coils in the continuous reception state (no at step S13 and no at step S17), the ASIC 28A determines that the sensor boards 7L and 7R are in the two-page spread state. On the other hand, when the sensor boards 7L and 7R are in the folded state, the induced magnetic field generated from the plurality of coils in the transmission/reception state acts on the plurality of coils in the continuous reception state. The induced current flows through the coils in the continuous reception state. Therefore, when the induced current has been detected in the plurality of coils in the continuous reception state (yes at step S13 and yes at step S17), the ASIC 28A determines that the sensor boards 7L and 7R are in the folded state.

As described above, simply by using the sensor boards 7L and 7R, which are used to detect the position of the electronic pen 3, the ASIC 28A can determine whether the sensor boards 7L and 7R are in the two-page spread state or in the folded state. When the sensor boards 7L and 7R are in the folded state, the ASIC 28A switches to the first power saving state. With the above-described processing, the power consumption when the sensor boards 7L and 7R are folded can be suppressed with a simple structure.

When the ASIC 28A causes the sensor boards 7L and 7R to operate in the first power saving state, the ASIC 28A causes the sensor board 7L to operate in the continuous transmission state. In the continuous transmission state, the current is intermittently applied to the single coil group 51 only, among the plurality of coil groups included in the plurality of loop coils of the sensor board 7L (step S21). With the above-described processing, the ASIC 28A can suppress the power consumption of the sensor board 7L in comparison to when the sensor board 7L is caused to operate in the transmission/reception state. Note that, even when the current is applied only to the coil group 51 of the sensor board 7L, the ASIC 28A can identify whether the sensor boards 7L and 7R are in the folded state, by determining whether the induced current flows through the plurality of loop coils of the sensor board 7R. In this manner, the ASIC 28A can appropriately suppress the power consumption of the sensor board 7L while continuously monitoring that the sensor boards 7L and 7R are in the folded state.

When the elapsed time from when the sensor boards 7L and 7R are brought into the folded state is the predetermined time period or more, it is less likely that the sensor boards 7L and 7R will be switched from the folded state to the two-page spread state. Therefore, when the elapsed time from the detection of the fold notification signal output from the ASIC 28A reaches the predetermined time period, the CPU 21 turns off the power supply from the battery 42 to the sensor control boards 28 and 29 (step S51). With the above-described processing, the CPU 21 causes the sensor boards 7L and 7R to operate in the second power saving state. In this case, the application of the current to the plurality of loop coils of each of the sensor boards 7L and 7R is also stopped. Therefore, the CPU 21 can significantly suppress the power consumption when the reading device 2 is in the folded state.

When the elapsed time in the folded state is less than the predetermined time period, there is a high possibility that the sensor boards 7L and 7R will return to the two-page spread state from the folded state. Therefore, when the elapsed time from when the sensor boards 7L and 7R are brought into the folded state is less than the predetermined time period (no at step S49), the CPU 21 causes the sensor boards 7L and 7R to operate continuously in the first power saving state. With the above-described processing, when the sensor boards 7L and 7R are returned to the two-page spread state from the folded state, the CPU 21 can appropriately return the sensor boards 7L and 7R to the original normal state.

When the elapsed time in the folded state is the predetermined time period or more, the sensor boards 7L and 7R may be switched to the second power saving state. In this case, the CPU 21 can significantly suppress the power consumption after the elapsed time in the folded state of the sensor boards 7L and 7R exceeds the predetermined time period. Further, the CPU 21 causes the sensor boards 7L and 7R to operate in the second power saving state, by turning off the power supply to the sensor control boards 28 and 29. In this case, the CPU 21 can not only suppress the power consumption by stopping the application of the current to the plurality of coils of the sensor boards 7L and 7R, but also can suppress the power consumption of the ASICs 28A and 29A of the sensor control boards 28 and 29. Thus, the CPU 21 can significantly suppress the power consumption of the reading device 2.

The present disclosure is not limited to the above-described embodiment, and various modifications are possible.

The reading device 2 is provided with the sensor boards 7L and 7R. However, the reading device 2 may be provided with a single sensor board that can bend and extend. The ASIC 28A may control the operation of a left-side portion of the single sensor board, and the ASIC 29A may control the operation of a right-side portion of the single sensor board.

In the first power saving state, within the sensor board 7L in the continuous transmission state, the position of the coil group 51 to which the current is applied need not necessarily be the position of the plurality of loop coils that are separated from the sensor board 7R, among the plurality of loop coils of the sensor board 7L. For example, within the sensor board 7L in the continuous transmission state, the position of the coil group 51 to which the current is applied may be a position of the plurality of loop coils that are close to the sensor board 7R, among the plurality of loop coils of the sensor board 7L. The ASIC 28A may also be able to switch the position of the coil group 51 to which the current is applied, as a result of settings.

In the first power saving state, in the sensor board 7L in the continuous transmission state, the current is intermittently applied to the coil group 51 only. However, the current may be intermittently applied to all of the plurality of loop coils in the sensor board 7L in the continuous transmission state. In this case, the ASIC 28A may suppress the power consumption of the sensor board 7L by increasing the period during which the current is applied to the plurality of loop coils.

When the ASIC 28A detects that the induced current is flowing through the plurality of loop coils of the sensor boards 7L and 7R in the continuous reception state (yes at step S13 and yes at step S17), the ASIC 28A may cause the reading device 2 to operate continuously in the normal state, without causing the reading device 2 to operate in the first power saving state. In this case, the ASIC 28A may shorten the time period during which the plurality of loop coils are in the transmission state in the sensor boards 7L and 7R, in comparison to when the sensor boards 7L and 7R are in the two-page spread state. Further, the ASIC 28A may increase the time period during which the plurality of loop coils are in the reception state in the sensor boards 7L and 7R, in comparison to when the sensor boards 7L and 7R are in the two-page spread state. With the above-described processing, the ASIC 28A may suppress the power consumption of the sensor boards 7L and 7R.

In the first power saving state, the ASIC 28A may cause the sensor board 7L to operate in the transmission/reception state, and may cause the sensor board 7R to operate in the continuous reception state. In this case, the ASIC 28A may shorten the time period during which the plurality of loop coils are in the transmission state in the sensor board 7L, in comparison to the normal state. The ASIC 28A may increase the time period during which the plurality of loop coils are in the reception state in the sensor board 7L, in comparison to the normal state. With the above-described processing, the ASIC 28A may suppress the power consumption of the sensor board 7L.

Figure 7:
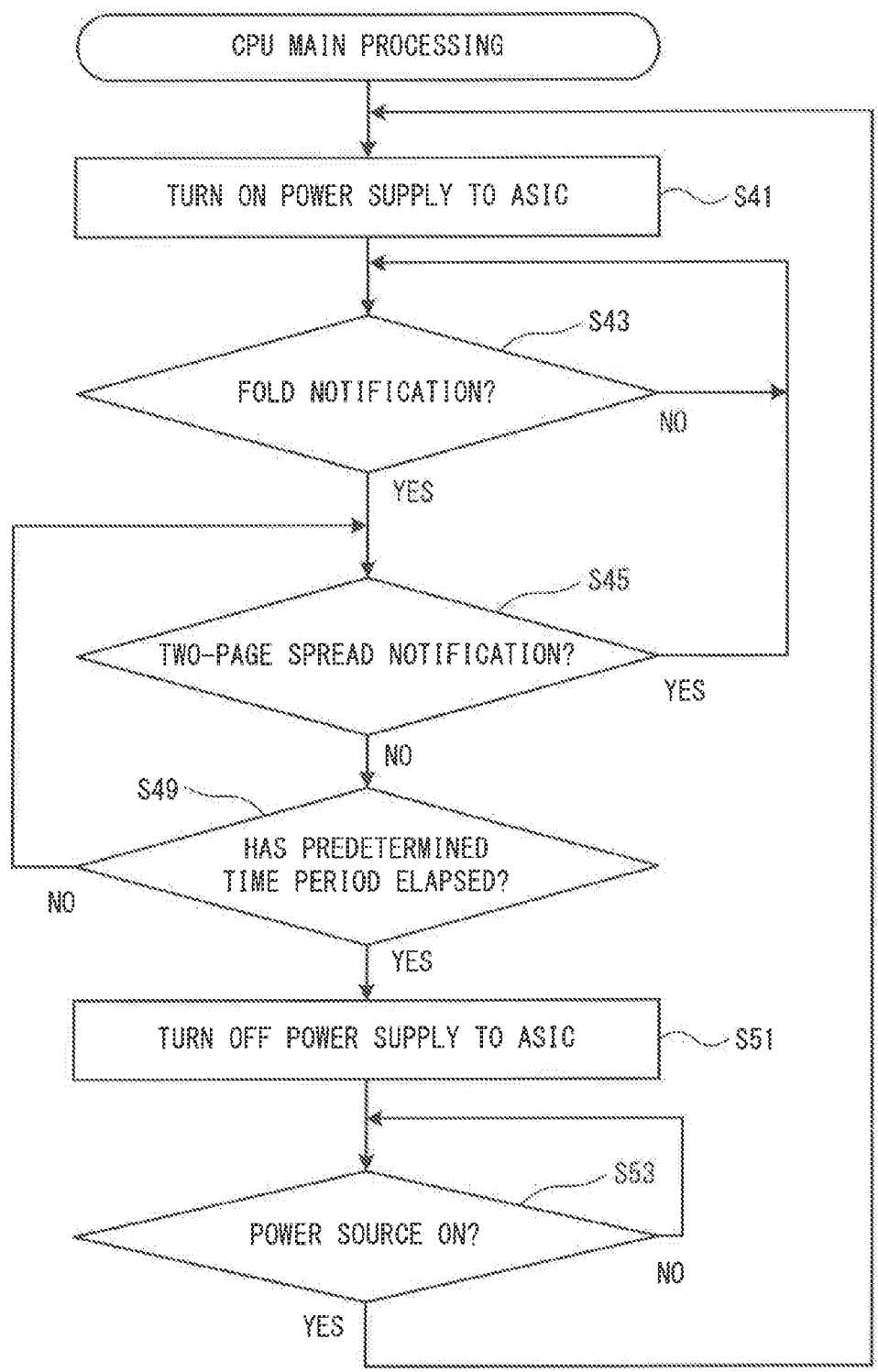
FIG. 7 is a flowchart of CPU main processing.

The CPU 21 may perform both the ASIC main processing (refer to FIG. 6) and the CPU main processing (refer to FIG. 7). Note that, when the CPU 21 performs the ASIC main processing, the CPU 21 may output a command signal to the ASIC 28A and may cause the ASICs 28A and 29A to control the sensor boards 7R and 7L.

What is claimed is:
1. An information input device comprising:
   a stylus;
   a detection portion having two areas in which a plurality of coils are arranged along a plane, the two areas being capable of switching between a folded state in which the areas face each other and a two-page spread state in which the areas do not face each other, and the detection portion having a normal state and a power saving state in which current consumption is less than that in the normal state, the coils further being configured to detect a position of the stylus via induced current flowing through the coils;
   a determination portion configured to:
      in a case where the detection portion alternately switches between a first state and a second state in the normal state, the first state being a state in which one of the two areas is in a transmission/reception state and, at the same time, the other of the two areas is in a continuous reception state, the second state being a state in which the one of the two areas is in the continuous reception state and, at the same time, the other of the two areas is in the transmission/reception state, the transmission/reception state being a state in which a transmission state, in which a current is applied to the plurality of coils, and a reception state, in which an induced current of the plurality of coils is able to be detected, are alternately switched, and the continuous reception state being a state in which the reception state, in which the induced current of the plurality of coils is able to be detected, is maintained,
      determine that the detection portion is in the two-page spread state when the induced current is not detected in any of the plurality of coils of the either of the two areas that is in the continuous reception state, and
      determine that the detection portion is in the folded state when the induced current is detected in any of the plurality of coils of the either of the two areas that is in the continuous reception state; and
   a switching portion configured to switch the state of the detection portion from the normal state to the power saving state when the determination portion determines that the detection portion is in the folded state, the switching portion including a first switching portion configured to switch the state of the detection portion to a first power saving state, in which current is applied to only a proper subset of the plurality of coils disposed in only the one of the two areas that is separated from the other of the two areas in the two-page spread state when it is determined that the detection portion is in the folded state.

2. The information input device according to claim 1, wherein
   in the first power saving state, the current is intermittently applied to only the proper subset of the plurality of coils.

3. The information input device according to claim 1, wherein
   the switching portion includes a second switching portion, the second switching portion switching the state of the detection portion to a second power saving state in which application of a current to the plurality of coils of each of the two areas is stopped.

4. The information input device according to claim 1, wherein
   the switching portion maintains the first power saving state when an elapsed time from when the determination portion determines that the detection portion is in the folded state is less than a predetermined time period.

5. The information input device according to claim 3, wherein
the second switching portion switches the state of the detection portion to the second power saving state when an elapsed time from when the determination portion determines that the detection portion is in the folded state is equal to or more than a predetermined time period.

6. The information input device according to claim 3, further comprising:
a control portion configured to perform control such that the detection portion switches between the first state and the second state,
wherein
the second switching portion switches the state of the detection portion to the second power saving state by turning off power supplied to the control portion.

7. An information input device comprising:
a detection portion having two areas in which a plurality of coils are arranged along a plane, the two areas being capable of switching between a folded state in which the areas face each other and a two-page spread state in which the areas do not face each other, and the detection portion having a normal state and a power saving state in which current consumption is less than that in the normal state, the coils further being configured to detect a position of a stylus via induced current flowing through the coils;
a processor; and
a memory storing computer-readable instructions, wherein the computer-readable instructions, when executed, cause the processor to perform processes comprising:
determining:
in a case where the detection portion alternately switches between a first state and a second state in the normal state, the first state being a state in which one of the two areas is in a transmission/reception state and, at the same time, the other of the two areas is in a continuous reception state, the second state being a state in which the one of the two areas is in the continuous reception state and, at the same time, the other of the two areas is in the transmission/reception state, the transmission/reception state being a state in which a transmission state, in which a current is applied to the plurality of coils, and a reception state, in which an induced current of the plurality of coils is able to be detected, are alternately switched, and the continuous reception state being a state in which the reception state, in which the induced current of the plurality of coils is able to be detected, is maintained,
that the detection portion is in the two-page spread state when the induced current is not detected in any of the plurality of coils of the either of the two areas that is in the continuous reception state, and
that the detection portion is in the folded state when the induced current is detected in any of the plurality of coils of the either of the two areas that is in the continuous reception state; and
switching the state of the detection portion from the normal state to the power saving state when it is determined that the detection portion is in the folded state, wherein switching the state of the detection portion to the power saving state includes applying current to only a proper subset of the plurality of coils disposed in only the one of the two areas that is separated from the other of the two areas in the two-page spread state when it is determined that the detection portion is in the folded state.

* * * * *